United States Patent [19]
Hirabayashi

[11] 3,926,387
[45] Dec. 16, 1975

[54] MAGNETIC REPRODUCING DEVICE

[75] Inventor: Nobuhiro Hirabayashi, Iwakura, Japan

[73] Assignee: Shin-Shirasuma Electric Corporation, Nagoya, Japan

[22] Filed: Apr. 11, 1974

[21] Appl. No.: 460,178

[52] U.S. Cl. .............................................. 242/198
[51] Int. Cl.$^2$ ..................... G03B 1/04; G11B 15/32; G11B 23/04
[58] Field of Search .................... 242/198, 189, 199; 360/93–96

[56] References Cited

UNITED STATES PATENTS

| | | | |
|---|---|---|---|
| 3,609,844 | 10/1971 | Ichikawa | 242/198 |
| 3,623,678 | 11/1971 | Housman | 242/198 |
| 3,695,552 | 10/1972 | Guyton | 242/198 |
| 3,729,202 | 4/1973 | Wakabayashi | 242/198 |
| 3,819,128 | 6/1974 | Hori et al. | 242/198 |

*Primary Examiner*—Leonard D. Christian

[57] ABSTRACT

A magnetic reproducing device of the type that a magnetic tape contained in a cassette can be transported so that sound pre-recorded thereon can be reproduced, simply by inserting the cassette therein, wherein there is provided a mechanism for selectively permitting the magnetic tape to be fast-forwarded. The fast-forward mechanism includes manually operable lock means adapted for engagement and disengagement with a lock pin provided on a slide chassis which is adapted to assume two different positions according to whether the cassette is inserted or not. Furthermore, the manually operable lock means includes means adapted to provide the sense of touch through which it can be confirmed whether or not the manually operable lock means is engaged with said lock pin.

3 Claims, 8 Drawing Figures

MAGNETIC REPRODUCING DEVICE

This invention relates to a magnetic reproducing device, and more particularly it pertains to a tape deck for car stereo wherein a magnetic tape contained in a cassette can selectively be transported at two different speeds.

It is an object of this invention to provide a magnetic reproducing device which is adapted to be operated simply by inserting a magnetic tape containing cassette so that the magnetic tape is transported at a first speed, wherein means is provided for selectively permitting the magnetic tape to be transported at a second speed substantially higher than the aforementioned first speed, said means including manually operable lock means.

Other objects, features and advantages of this invention will become apparent from the following description taken in conjunction with the accompanying drawings, in which.

Figure 1:
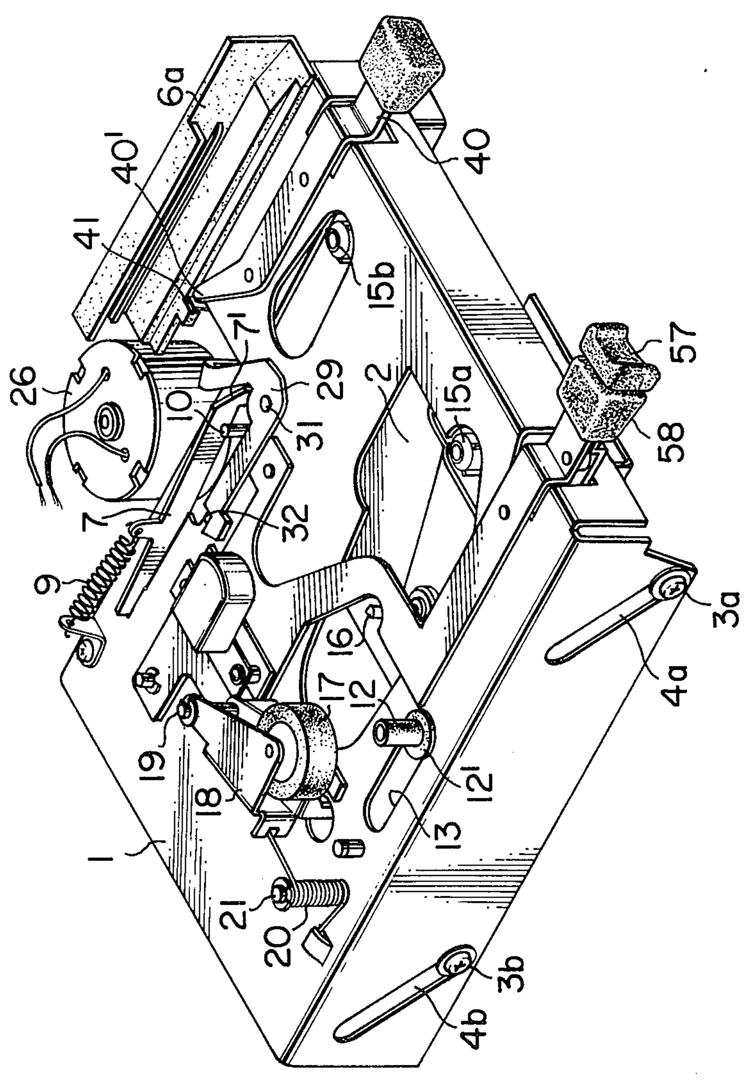
FIG. 1 is a schematic perspective view showing the internal portion of the magnetic reproducing device according to an embodiment of this invention when no cassette is inserted.

Referring to the drawings, there is shown the tape deck for car stereo according to a preferred embodiment of this invention, which includes a main chassis 1 and a slide chassis 2 provided therebelow which is slidably secured to the main chassis at one side by means of screws 3*a* and 3*b* disposed in loose engagement with oblique guide slots 4*a* and 4*b* formed in one side wall of the main chassis respectively and at the other side by means of a screw 3*c* (see FIG. 3) disposed in loose engagement with a similar guide slot 4*c* formed in the opposite side wall of the main chassis.

Figure 2:
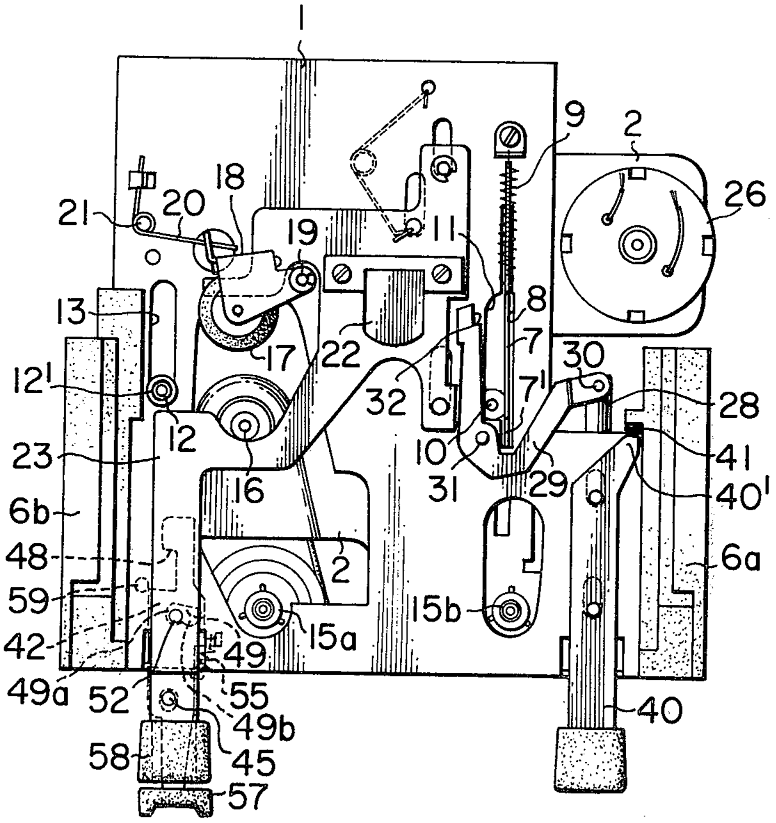
FIG. 2 is a top plan view of the device shown in FIG. 1.
Figure 3:
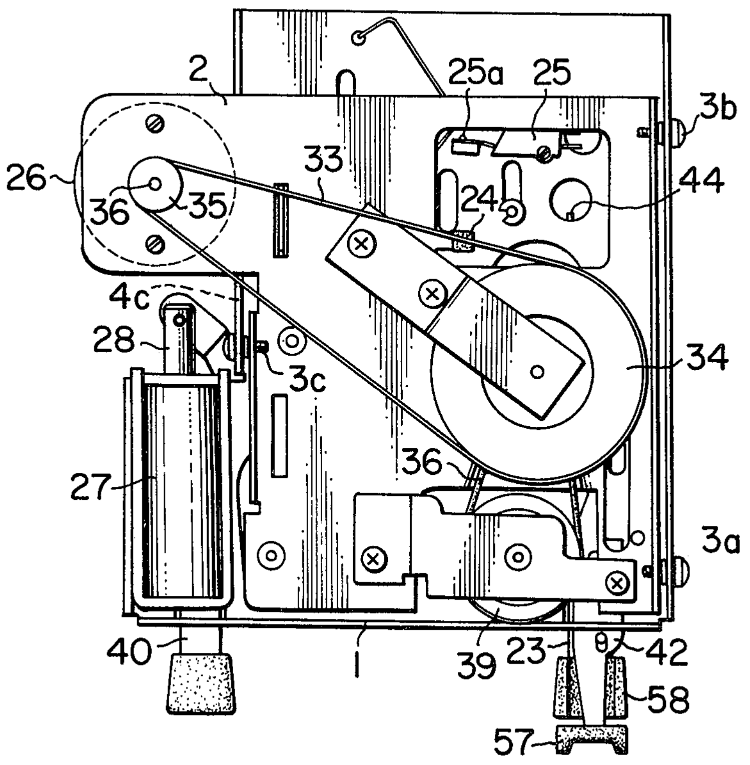
FIG. 3 is a bottom plan view of the device shown in FIG. 1.

FIGS. 1 through 3 show the case where no cassette is loaded so that the device is stopped, and FIGS. 4 through 7 show the case where a cassette 5 is loaded so that the device is rendered operative.

When inserted from the front between a pair of guide-support members 6*a* and 6*b* (one of these members, 6*b* is not shown in FIGS. 1 and 4 for the sake of clarity) which are provided on the opposite sides of the main chassis 1, the cassette 5 will first be engaged at its back wall with a sloped end portion 7′ of a pivotal member 7 which is pivotally disposed in a slit 8 formed in the main chassis and upwardly biased by means of a spring 9, and then the cassette 5, while pushing down the pivotal member 7 against the spring 9, will be engaged with a vertical pin 10 which is provided on the slide chassis 2 in such a manner as to upwardly extend through an elongated aperture 11 formed in the main chassis 1. At this point, the back wall of the cassette 5 will also be engaged with a sleeve-like member 12 with a flange 12′ in slidable engagement with an elongated aperture 13 formed in the main chassis. A second vertical pin 14 which is also provided on the slide chassis 2, is loosely inserted in the sleeve-like member 12. As the cassette 5 is further pushed in, the slide chassis 2 will be slidden forwardly and upwardly while being guided by the aforementioned oblique slots 4*a*, 4*b* and 4*c*, because of the engagement of the cassette's back wall with the vertical pin 10 and the sleeve-like member 12 in which the second vertical pin 14 is inserted. When the cassette is fully inserted, the slide chassis is caused to assume such a position as shown in FIGS. 4 through 7. At this point, a pair of reel shafts 15*a* and 15*b* which are rotatably provided on the slide chassis 2, are inserted through the reel holes of the cassette 5 respectively, and a capstan 16 which is rotatably provided on the slide chassis, is brought into contact a pinch roller 17 with a magnetic tape 5′ held therebetween. The pinch roller 17 is rotatably carried by a U-shaped carrier 18 which is pivotally mounted on a vertical shaft 19 provided on the main chassis 1, and it is normally biased toward the capstan 16 by means of a spring 20 which is loaded on a vertical pin 21 provided on the main chassis with one end thereof engaged with the pinch roller carrier 18. The magnetic tape is also contacted by a reproduce head 22 which is mounted on a fast-forward lever 23 which will be fully described hereinafter. At the same time, an actuator projection 24 (see FIGS. 3 and 6) provided on the slide chassis 2 is brought into engagement with a movable contact 25*a* of a power switch 25 (see FIG. 3) so that the movable contact 25*a* is brought into engagement with a fixed contact 25*b* of the switch 25, thus resulting in the latter being closed as will be clearly seen from FIG. 6. Thus, a drive motor 26 provided on the slide chassis 2 is rotated at a speed corresponding to the normal tape transporting speed. At the same time, a solenoid 27 (see FIG. 3) is also energized so that a plunger 28 coupled thereto is displaced from the extended position shown in FIG. 3 to the retracted position shown in FIG. 6. As a result, a locking member 29 which is connected at 30 with the free end portion of the plunger 28 and has its center portion rotatably supported by a vertical pin 31 provided on the main chassis, is rotated from the position shown in FIG. 2 to the position shown in FIG. 5, so that a notched portion 32 at the free end of the locking member 29 is engaged with the vertical pin 10. In this way, the slide chassis 2 is locked at the position as shown in FIGS. 4 through 7.

The rotation of the motor 26 is imparted through an endless belt 33 to a flywheel 34 which is fixedly secured to the lower end portion of the capstan 16, so that the latter is rotated while being disposed in press engagement with the pinch roller 17 with the magnetic tape held therebetween. The rotation of the motor is also imparted to the reel shaft 15*a* via the endless belt 33 extending between a pulley 35 provided at the free end of the motor shaft 36 and the flywheel 34 and through an endless belt 37 extending between a pulley 38 provided at the lower end of the capstan 16 above the flywheel and a pulley 39 provided at the lower end of the reel shaft 15*a*. Thus, the magnetic tape will be forwardly transported from the spool on the reel shaft 15*b* so as to be wound onto the spool on the reel shaft 15*a*. In this way, sound which is prerecorded on the magnetic tape can be reproduced by means of the magnetic head 22.

Figure 5:
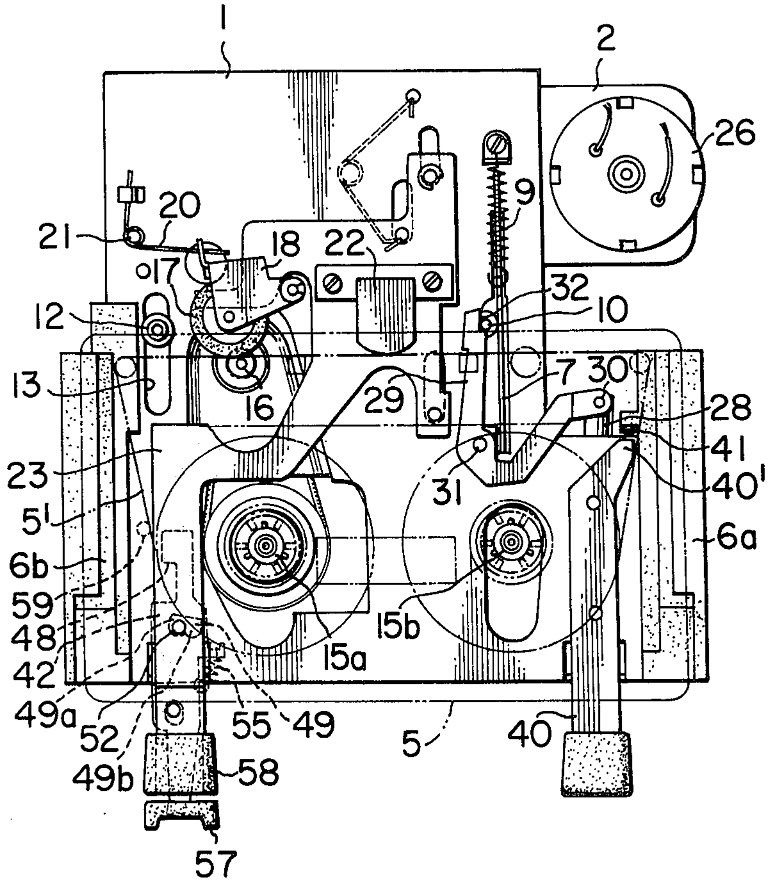
FIG. 5 is a top plan view of FIG. 4.

The playback operation of the device can be stopped by pushing a top lever 40 which is slidably provided on the main chassis. More specifically, when pushed, the stop lever 40 will have its fore end 40' engaged with a contact 41 of another switch (not shown) which is adapted to deenergize the solenoid 27, thus actuating the switch to deenergize the solenoid 27. Upon deenergization of the solenoid 27, the plunger 28 will be extended from the retracted position as shown for example in FIG. 6 to the position as shown for example in FIG. 3, whereupon the locking member 29 connected with the plunger 28 will be rotated about the pin 31 from the position as shown in FIG. 5 where it is engaged with the vertical pin 10 to the position as shown in FIG. 2 where it is disengaged therefrom. As a result, the slide chassis 2 will automatically be slidden down to the position as shown in FIGS. 1 through 3, so that the power switch 25 will be opened and the device will be automatically shut off.

Figure 8:
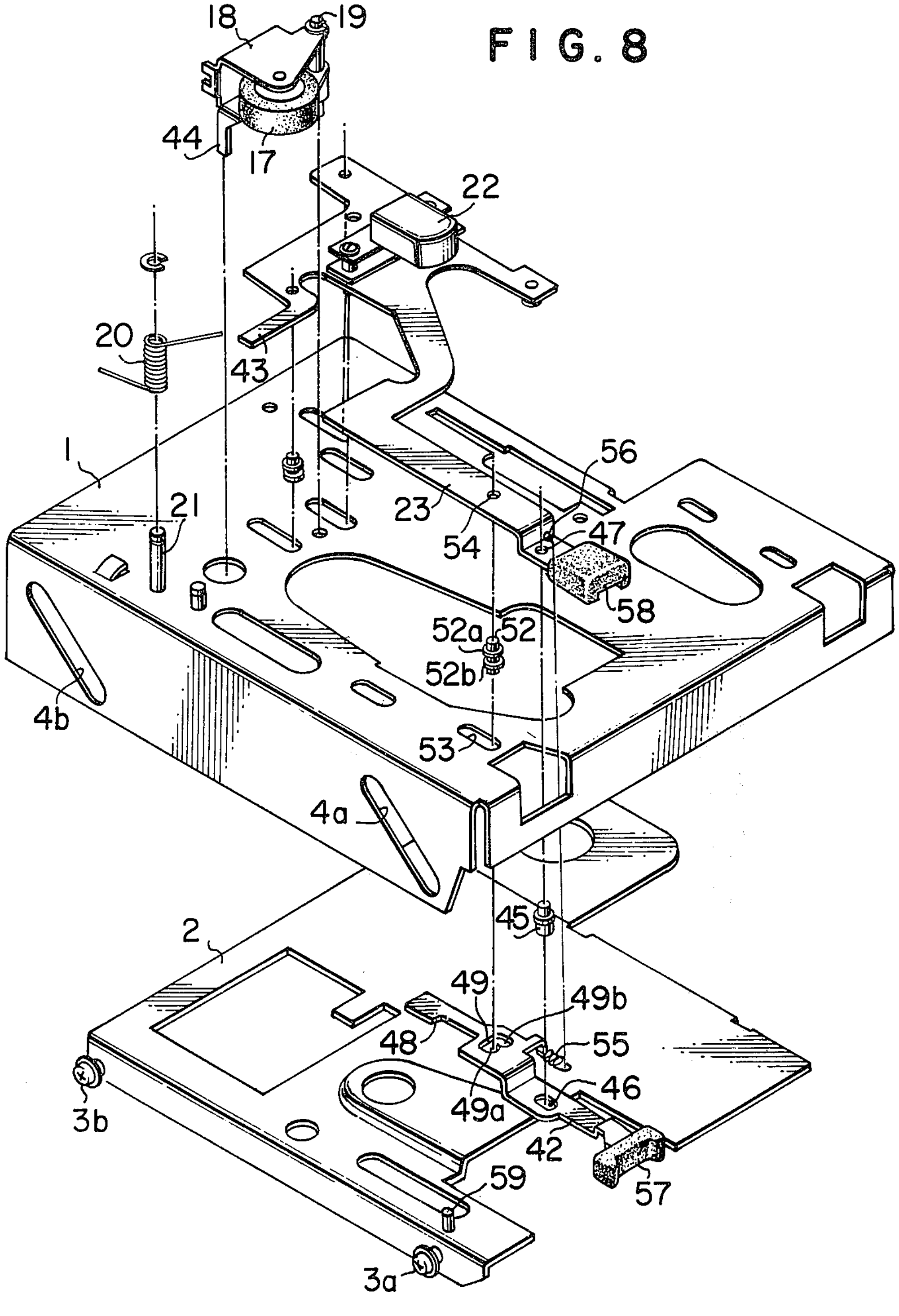
FIG. 8 is an exploded view useful for explaining the novel construction of this invention.

In order to transport the magnetic tape at a speed higher than the aforementioned normal transporting speed, that is, in order to effect fast-forwarding of the magnetic tape, the fast-forward mechanism according to this invention is manipulated which comprises the fast-forward lever 23 and a lock lever 42. FIG. 8 illustrates how the fast-forward lever 23 and lock lever 42 are assembled to constitute the fast-forward mechanism. The fast-forward lever 23 is slidably and securely placed on the main chassis 1 and has its lateral extension 43 engaged with a vertical extension 44 depending from the pinch-roller carrier 18 so as to be normally biased by the spring 20 in such a direction that when the cassette is inserted the magnetic head 22 can engage the magnetic tape contained therein. The lock lever 42 is located underneath the main chassis 1 along the fast-forward lever 23 and slidably secured to the latter by means of a suitable securing member such as indicated at 45 which is inserted at its lower end in an elongated aperture 46 formed in the lock lever 42 and at its upper end in an aperture 47 formed in the fast-forward lever 23. Furthermore, the lock lever 42 has a notched portion 48 in the fore end portion thereof, a doubleconcave aperture 49 in the intermediate portion thereof and a spring retaining portion 50 at one side thereof. A pin-like sensing member 52 is provided with flanges **52*a* and 52*b*, and it is slidably inserted in an elongated aperture 53 formed in the main chassis 1 with the flanges 52*a* and 52*b* thereof disposed in contact with the upper and lower surfaces of the main chassis 1 respectively. The pin-like sensing member 52 has its upper end fixedly secured to the fast-forward lever 23 at an aperture 54 formed therein. The lower end of the pin-like sensing member 52 is disposed in engagement with the double-concave aperture 49 of the lock lever 42. A spring 55 has its opposite ends retained at the spring retainer 50 of the lock lever 42 and at an aperture 56 formed in the fast-forward lever 23. It is to be noted that when the fast-forward mechanism is in the non-actuated position as shown for example in FIG. 5, the lower end of the pin-like sensing member 52 is disposed in engagement with one of the concave portions, 49*a* of the doubleconcave aperture 49 formed in the lock lever 42. Furthermore, the lock lever 42 can be rotated about the securing member 45 against the spring 55 loaded between the lock lever 42 and the fast-forward lever 23. A thumb 57 provided on the lock lever 42 is associated with a thumb 58 on the fast-forward lever 23 in such a manner as to be slidingly displaceable over the end surface of the fast-forward lever's thumb 58 when the aforementioned rotation of the lock lever 42** is effected.

Figure 4:
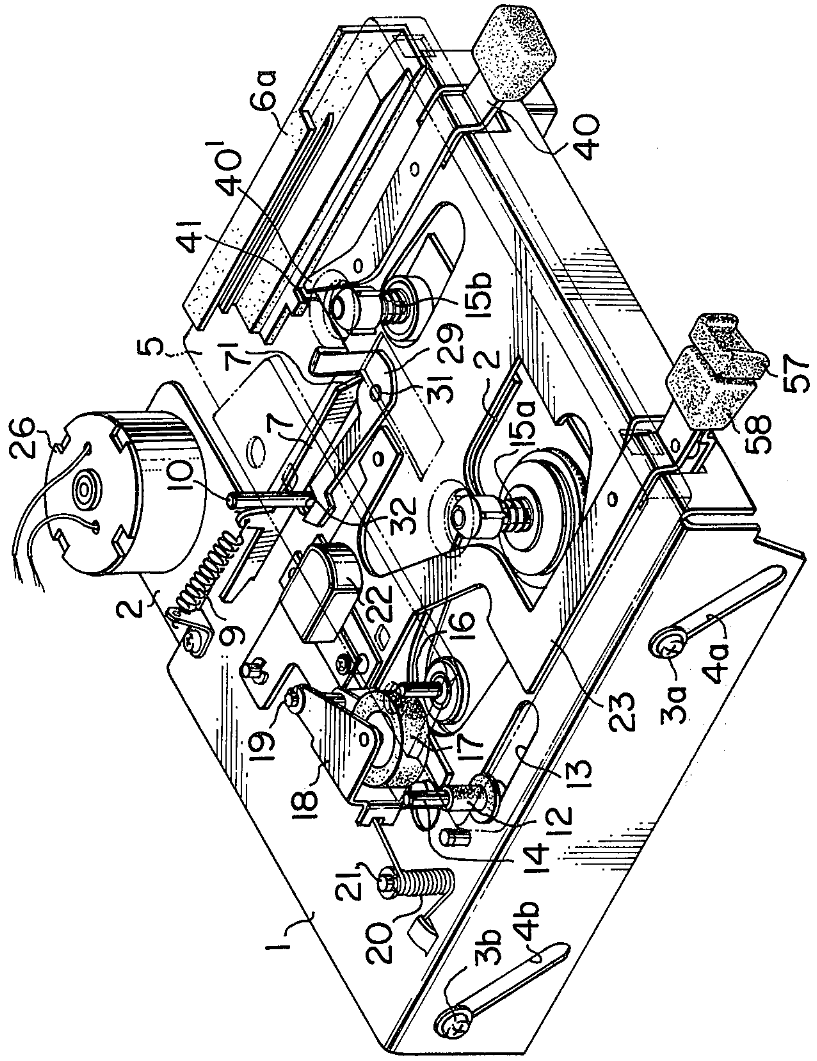
FIG. 4 is a view which is similar to FIG. 1 except that a cassette is inserted.
Figure 6:
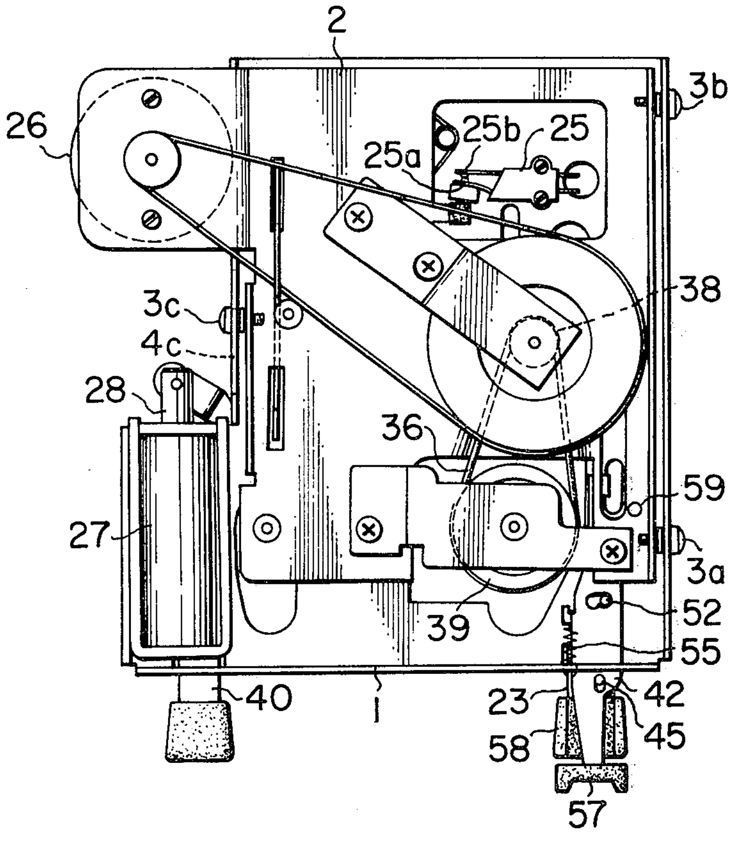
FIG. 6 is a bottom plan view of FIG. 4.

As mentioned proviously previously connection with FIGS. 4 through 6, when the cassette is inserted, the magnetic tape contained therein is transported at the aforementioned normal transporting speed from the reel shaft **15*b* side to the reel shaft 15*a* side, so that sound pre-recorded thereon can be reproduced by the magnetic head 22. In the case where it is desired that the magnetic tape be fast-forwarded during the playback operation of the device, the fast-forward mechanism according to this invention is actuated; That is, the fast-forward lever 23 is pushed in, together with the lock lever 42. When the fast-forward lever 23 is fully pushed in, the notched portion 48 of the lock lever 42 is located at a position where it can be engaged with a vertical lock pin 59 which is provided on the slide chassis 2. At this point, by sliding the thumb 57 of the lock lever 42 with a finger tip to rotate the lock lever 42 about the securing member 45 anticlockwise as viewed in FIG. 5, the notched portion 48 of the lock lever 42 will be brought into locking engagement with the lock pin 59 provided on the slide chassis 2. In this case, pushing the fast-forward lever 23 as described above will cause the pinch roller 17 to be disengaged from the capstan 16. At the same time, a change-over switch (not shown) which is provided in the neighborhood of the fore end of the lock lever, will be actuated so that an electric circuit arrangement (not shown) is switched to cause the motor 26 to be rotated at a speed substantially higher than that corresponding to the aforementioned normal tape transporting speed. In this way, fast-forwarding of the magnetic tape can be achieved. It is to be noted here that when the lock lever 42 is rotated in the above-mentioned manner, the pin-like sensing member 52 which was initially engaged with the concave portion 49*a* of the double-concave aperture 49 in the lock lever 42, is now engaged with the other concave portion 49*b* and that the locking engagement of the notched portion 48 of the lock lever 42 with the lock pin 59 provided on the slide chassis 2 can be confirmed through the sense of touch which is provided when the pin-like sensing member 52 is changed in engagement from the concave portion 49*a* to the concave portion 49*b* of the lock lever 42**.

The fast forwarding operation can be interrupted simply by slightly pushing the thumb 57 provided on the lock lever 42 and sliding it in the direction opposite to the direction in which it was slidden to cause it to be engaged with the lock pin 59, so that the playback operation can be automatically started.

If it is desired that only a small length of the magnetic tape be fast-forwarded, this can be achieved simply by pushing the fast-forward lever 23 without causing the notched portion 48 of the lock lever 42 to be engaged with the lock pin 59 provided on the slide chassis 2.

Figure 7:
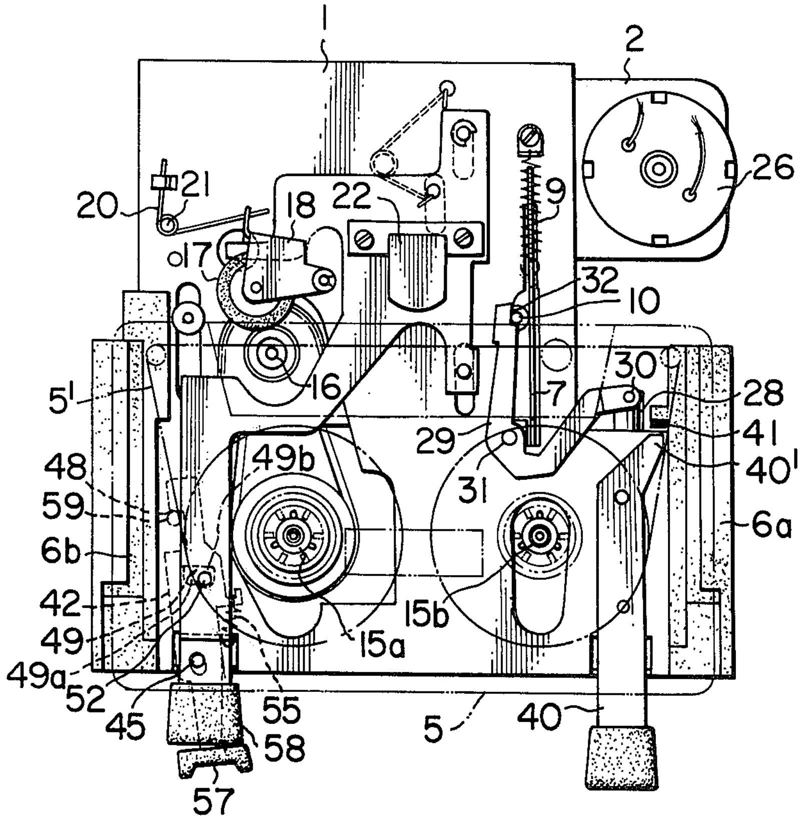
FIG. 7 is view which is similar to FIG. 5 except that the fast-forward lever is locked in pushed-in position.

When it is desired that the device be shut off while the magnetic tape is being fast-forwarded as shown in FIG. 7, the stop lever 40 is pushed in, so that the locking member 29 connected with the plunger 28 is disengaged from the vertical pin 10, with a result that the slide chassis 2 is dropped in such a direction that the lock pin 59 provided thereon is disengaged from the notched portion 48 of the lock lever 42. Thus, the device is returned to the state as shown in FIGS. 1 through 3.

While the invention has been described with respect to specific embodiments thereof, it should be understood that the invention is not restricted to those embodiments but various modifications may be made therein without departing from the spirit and scope of the invention as defined in the appended claims.

What is claimed is:

1. In a magnetic reproducing device having means for receiving a cassette, first means for transporting a magnetic tape contained in said cassette at a first speed and rendered operable when said cassette is inserted in said means for receiving same, second means for transporting said magnetic tape at a second speed substantially higher than said first speed, and means for reproducing sound pre-recorded on said magnetic tape, a slide chassis having means engageable by said cassette when inserted in said means for receiving same and movable from a first position to a second position, an actuator on said slide chassis for engaging said first transporting means and rendering same operable when said slide chassis is moved to said second position, a fast-forward mechanism comprising a manually operable lock means movable to operate said second transporting means, a lock pin on said slide chassis, said lock means being movable into locking engagement with said lock pin when said slide chassis is in said second position, and indicating means on said lock means for confirming by sense of touch the position of said manually operable lock means.

2. In a magnetic reproducing device according to claim 1, wherein said indicating means comprises a sensing member on said fast-forward mechanism selectively engageable with concave portions of a double-concave aperture formed on said lock means.

3. In a magnetic reproducing device according to claim 1, including stop means adapted, when operated, to cause said slide chassis to be displaced from said second position to said first position, wherein said manually operable lock means is adapted to be disengaged from said lock pin by being manually actuated or through manipulation of said stop means.

* * * * *